(12) United States Patent
Jung et al.

(10) Patent No.: US 11,964,582 B2
(45) Date of Patent: Apr. 23, 2024

(54) SYSTEM FOR DIAGNOSING IN-CABLE CONTROL BOX OF ELECTRIC VEHICLE AND METHOD FOR CONTROLLING THE SAME

(71) Applicants: Hyundai Motor Company, Seoul (KR); Kia Corporation, Seoul (KR); Yura Corporation Co., Ltd., Seongnam-si (KR)

(72) Inventors: Yun-Jae Jung, Suwon-si (KR); Young-Hoo Yoon, Suwon-si (KR); Dae-Hwan Kwon, Seongnam-si (KR)

(73) Assignees: Hyundai Motor Company, Seoul (KR); Kia Corporation, Seoul (KR); Yura Corporation Co. Ltd., Seongnam-si (KR)

( * ) Notice: Subject to any disclaimer, the term of this patent is extended or adjusted under 35 U.S.C. 154(b) by 481 days.

(21) Appl. No.: 17/339,465

(22) Filed: Jun. 4, 2021

(65) Prior Publication Data
US 2022/0024339 A1    Jan. 27, 2022

(30) Foreign Application Priority Data
Jul. 24, 2020  (KR) .......................... 10-2020-0092560

(51) Int. Cl.
*B60L 53/66*      (2019.01)
*G07C 5/08*       (2006.01)
*B60L 53/18*      (2019.01)

(52) U.S. Cl.
CPC ............ *B60L 53/66* (2019.02); *G07C 5/0808* (2013.01); *B60L 53/18* (2019.02)

(58) Field of Classification Search
CPC ........ B60L 53/66; B60L 53/18; G07C 5/0808
See application file for complete search history.

(56) References Cited

U.S. PATENT DOCUMENTS

| 2013/0020992 A1* | 1/2013 | Wu | .......................... B60L 53/63 320/109 |
| 2016/0096438 A1* | 4/2016 | Grimes | ................... B60L 53/18 320/109 |
| 2019/0061552 A1* | 2/2019 | Amari | ...................... H02J 3/14 |

(Continued)

FOREIGN PATENT DOCUMENTS

KR    10-2019-0081757 A    7/2019

*Primary Examiner* — Hussein Elchanti
(74) *Attorney, Agent, or Firm* — Morgan, Lewis & Bockius LLP

(57) ABSTRACT

A system for diagnosing an in-cable control box (ICCB) is installed in a vehicle, electrically connected, at one side thereof, to a low-speed charging cable having the ICCB, electrically connected, at another side thereof, to an on-board diagnostics (OBD) device, and is configured to diagnose the ICCB. The system includes a Control Pilot (CP) data conversion unit configured to receive charging situation data produced from the ICCB; a Controller Area Network (CAN) communication unit configured to receive diagnosis initiating data for the ICCB produced from the OBD device; and a control unit configured to receive the charging situation data from the CP data conversion unit, convert the charging situation data into data recognizable by the OBD device, receive the diagnosis initiating data from the CAN communication unit, and convert the diagnosis initiating data into data recognizable by the ICCB.

7 Claims, 4 Drawing Sheets

(56) References Cited

U.S. PATENT DOCUMENTS

| | | | |
|---|---|---|---|
| 2019/0280509 A1* | 9/2019 | Yokoyama | H02J 7/00 |
| 2020/0079238 A1* | 3/2020 | Kwon | H04B 3/544 |
| 2020/0238841 A1* | 7/2020 | Zaki | B60L 53/60 |
| 2020/0273268 A1* | 8/2020 | Bhattacharyya | G06Q 10/06315 |
| 2022/0024339 A1* | 1/2022 | Jung | B60L 53/66 |

* cited by examiner

SYSTEM FOR DIAGNOSING IN-CABLE CONTROL BOX OF ELECTRIC VEHICLE AND METHOD FOR CONTROLLING THE SAME

CROSS-REFERENCE TO RELATED APPLICATION(S)

This application claims the benefit of priority to Korean Patent Application No. 10-2020-0092560, filed on Jul. 24, 2020, in the Korean Intellectual Property Office, the disclosure of which is incorporated herein by reference in its entirety.

TECHNICAL FIELD

The present disclosure relates to a system for diagnosing an in-cable control box of an electric vehicle and a method for controlling the same, and more particularly, to a system for diagnosing an in-cable control box (ICCB), the system being installed in a vehicle, electrically connected, at one side thereof, to a low-speed charging cable having the ICCB, electrically connected, at another side thereof, to an on-board diagnostics (OBD) device, and configured to diagnose the ICCB based on an instruction of the OBD.

BACKGROUND

In general, a low-speed charging cable is used to charge a battery for an electric vehicle with commercially available alternating current power.

The low-speed charging cable includes a connector connected to a charging outlet of the electric vehicle, an in-cable control box (abbreviated to 'ICCB') configured to monitor and control electric power applied to the battery for a vehicle from a commercially available alternating current power source, and a plug connected to an electrical outlet of the commercially available alternating current power source.

The ICCB produces charging situation data called a control pilot (abbreviated to 'CP').

When the ICCB recognizes that the connector is connected to the charging outlet of the electric vehicle and the charging preparation is completed, the ICCB switches the relay to an ON state and controls the alternating current power to be applied to the vehicle.

In addition, the ICCB performs a protection function of protecting a user and a vehicle from overvoltage or overcurrent during a process of charging the battery, and the ICCB displays, on a display means, a connection status with the vehicle during a charging operation, a maximum charging current value, and a charging progress status.

However, in a case in which the charging is interrupted due to an abnormal situation during the charging operation using a low-speed charging cable in the related art, the ICCB switches the relay to an 'OFF' state and displays, on the display means, that the power is cut off and the charging is interrupted.

In this case, because the ICCB indicates that the charging is interrupted in the form of a simplified icon, there is a problem in that the user cannot clearly recognize the reason why the charging is interrupted.

For this reason, when a charging interruption icon is displayed on the display means of the ICCB, there is concern that a large amount of time is required to recognize a failure site, and unnecessary maintenance is caused because the interruption of charging is considered as a failure of the ICCB, maintenance is requested, and the ICCB is sometimes disassembled during the maintenance.

There has also been well known a technology in which the ICCB monitors a charging situation and transmits charging situation data to a server through a wireless communication network, and the server transmits the charging situation data to a wireless communication device such as a user's mobile phone to allow the user to recognize the charging situation through the user's wireless communication device.

However, even in the case in which the charging situation is displayed by using the wireless communication device as described above, the reason why the charging is interrupted is not clearly displayed, and as a result, there is always a problem in that a large amount of time is required to recognize a failure site of the ICCB and unnecessary maintenance is caused. Further, because a wireless communication module for wireless communication is embedded in the ICCB, there is a drawback in that a volume of a low-speed charging cable is increased, manufacturing costs are increased, and certification for wireless communication is required.

In addition, the charging situation data are managed by the server, there is concern that costs are incurred to establish and maintain a facility for operating the server and a communication status deteriorates in the event of rainfall or snowfall because of wireless communication characteristics.

The information included in this Background section is only for enhancement of understanding of the general background of the present disclosure and may not be taken as an acknowledgement or any form of suggestion that this information forms the prior art already known to a person skilled in the art.

SUMMARY

The present disclosure has been made in an effort to provide a configuration of a system for diagnosing an in-cable control box of an electric vehicle, which can provide information on charging interruption when the charging is interrupted due to an abnormal situation during a charging operation, such that a failure site may be easily recognized and excellent maintainability may be implemented.

An exemplary embodiment of the present disclosure provides a system for diagnosing an in-cable control box (ICCB) for an electric vehicle, the system being disposed in a vehicle, electrically connected, at one side thereof, to a low-speed charging cable having the ICCB, electrically connected, at the other side thereof, to an on-board diagnostics (OBD) device, and configured to diagnose the ICCB based on an instruction of the OBD device. The system includes a Control Pilot (CP) data conversion unit configured to receive charging situation data produced from the ICCB; a Controller Area Network (CAN) communication unit configured to receive diagnosis initiating data for the ICCB produced from the OBD device; and a control unit configured to receive the charging situation data from the CP data conversion unit, convert the charging situation data into data recognizable by the OBD device, receive the diagnosis initiating data from the CAN communication unit, and convert the diagnosis initiating data into data recognizable by the ICCB.

Another exemplary embodiment of the present disclosure provides an in-cable control box (ICCB) of a low-speed charging cable for an electric vehicle comprising: a controller configured to produce charging situation data; a Control Pilot (CP) drive circuit configured to output the charging situation data produced from the controller; and a Universal Asynchronous Receiver/Transmitter (UART) interface connected between the CP drive circuit and the controller, the UART interface configured to perform UART communication.

Still another exemplary embodiment of the present disclosure provides a method of controlling a system for diagnosing an in-cable control box (ICCB), wherein the system has one side electrically connected to a low-speed charging cable having the ICCB and another side electrically connected to an on-board diagnostics (OBD) device, the method comprising: receiving, by the ICCB, a diagnosis initiating instruction from the OBD device and entering a diagnosis mode for diagnosing the ICCB when a connector of the low-speed charging cable is connected to a charging outlet of the system; checking, by the ICCB, a type of instruction when the diagnosis initiating instruction is received from the OBD device; and recognizing, by the ICCB, whether the ICCB is currently in a failure state and transmitting a failure code corresponding to the recognized failure state to the OBD device, when the diagnosis initiating instruction includes an instruction to request a response to the failure code.

According to the system for diagnosing an in-cable control box for an electric vehicle and the method for controlling the system according to the present disclosure configured as described above, the ICCB may transmit and receive the data, such that the ICCB may clearly display, on the display means, the reason why the charging is interrupted, thereby quickly recognizing a failure site of the ICCB and preventing abnormal maintenance.

Because it is not necessary to embed a separate module for wireless communication, a separate procedure of certification for wireless communication is not required, and a size of the low-speed charging cable may be kept compact.

Even in a case in which a casing of the ICCB is assembled by a bolt or fused by heat or friction, it is not necessary to unfasten the bolt from the casing or break the casing, and as a result, it is possible to update software, diagnose an internal failure, and check a charging history without damaging the casing any further.

DETAILED DESCRIPTION OF THE EMBODIMENTS

Hereinafter, configurations and operations of a system for diagnosing an in-cable control box for an electric vehicle and a method for controlling the system according to the present disclosure will be described in detail with reference to the drawings.

However, the disclosed drawings are provided as an example for fully conveying the spirit of the present disclosure to those skilled in the art. Therefore, the present disclosure is not limited to the drawings disclosed below and may be specified as other aspects.

Unless otherwise defined, the terminologies used in the specification of the present disclosure have the meanings that a person with ordinary skill in the art to which the present disclosure pertains typically understands, and in the following description and the accompanying drawings, a detailed description of publicly known functions and configurations will be omitted so as to avoid unnecessarily obscuring the subject matter of the present disclosure.

Figure 1:
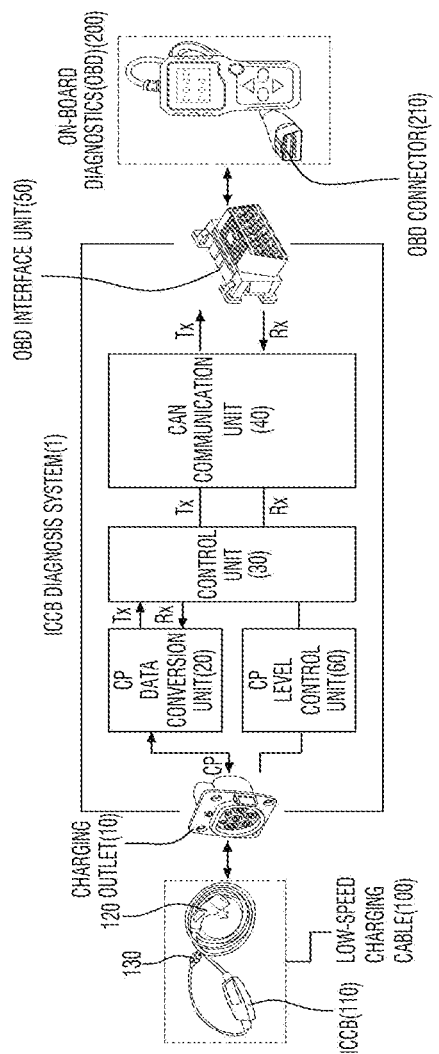
FIG. 1 is a configuration view of a system for diagnosing an in-cable control box according to the present disclosure.

FIG. 1 is a configuration view of a system for diagnosing an in-cable control box according to the present disclosure.

Referring to FIG. 1, a system 1 for diagnosing an in-cable control box (ICCB) (hereinafter, referred to as an 'ICCB diagnosis system', for convenience) according to the present disclosure refers to a system installed in a vehicle, electrically connected, at one side thereof, to a low-speed charging cable 100 having the ICCB 110, electrically connected, at the other side thereof, to an on-board diagnostics (abbreviated to 'OBD') device 200, and configured to diagnose the ICCB 110 of the low-speed charging cable 100.

The low-speed charging cable 100 includes a connector 120 configured to be electrically connected to a charging outlet 10 for a vehicle, and a plug 130 configured to be connected to a commercially available alternating current power source.

As described above, the ICCB 110 produces charging situation data called a control pilot (abbreviated to 'CP').

When the ICCB 110 recognizes that the charging preparation is completed in the state in which the connector 120 is connected to the charging outlet 10 of the electric vehicle, the ICCB 110 switches an embedded relay to an On state and controls commercially available alternating current power to be applied to the vehicle.

The ICCB 110 performs a protection function of protecting a user and the vehicle from overvoltage or overcurrent during an operation of charging the battery of the vehicle, and the ICCB 110 displays a connection status with the vehicle during the charging operation, a maximum charging current value, and a charging progress status on a display means (not illustrated) attached to a casing of the ICCB 110.

The OBD device 200 is a well-known device that communicates with an electronic control unit (ECU) of the vehicle in a state in which an OBD connector 210 is connected to an OBD interface 50 of the vehicle. The OBD device 200 inspects the vehicle by recognizing electrical and electronic operating states of various types of devices and modules installed in the vehicle, based on the communication result. The OBD device 200 produces diagnosis result data, which are obtained by the diagnosis, and displays the diagnosis result data on the display means (not illustrated) attached to the casing of the OBD device 200, thereby enabling a mechanic to recognize to recognize a failure site or an internal status of the vehicle.

In this case, the OBD device 200 uses unified diagnostic service (UDS) protocol, and the UDS protocol is a specific protocol for diagnosing a vehicle, requesting a specific operation for the vehicle, and upgrading software for controlling the vehicle.

More specifically, the ICCB diagnosis system 1 according to the present disclosure includes a CP data conversion unit 20 that receives the charging situation data (the control pilot (CP)), which are produced from the ICCB 110 of the low-speed charging cable 100, through the charging outlet 10 electrically connected to the connector 120 of the low-speed charging cable 100, and converts the charging situation data into data that may be read out by a control unit 30.

The ICCB diagnosis system 1 according to the present disclosure includes a CAN communication unit 40 that receives diagnosis initiating data of the ICCB, which are produced from the OBD device 200, through the OBD interface unit 50 electrically connected to the OBD connector 210 of the OBD device 200.

The ICCB diagnosis system 1 according to the present disclosure includes the control unit 30 that receives the charging situation data from the CP data conversion unit 20 to convert the charging situation data into data that may be recognized by the OBD device 200, and receives the diagnosis initiating data from the CAN communication unit 40 to convert the diagnosis initiating data into data that may be recognized by the ICCB 110.

The ICCB diagnosis system 1 according to the present disclosure includes a CP level adjustment unit 60 that adjusts a voltage level of the charging situation signal (the control pilot (CP)) during a process of updating the ICCB 110, when update instruction data are received from the OBD device 200.

The control unit 30 of the ICCB diagnosis system 1 according to the present disclosure configured as described above performs a diagnosis mode for diagnosing the ICCB only when the ICCB is electrically connected to the OBD device 200. When the control unit 30 receives a diagnosis ending instruction from the OBD device 200 while performing the diagnosis mode or when the electrical connection between the ICCB and the OBD device 200 is cut off, the control unit 30 ends the diagnosis mode and switches to a charging mode.

Figure 2:
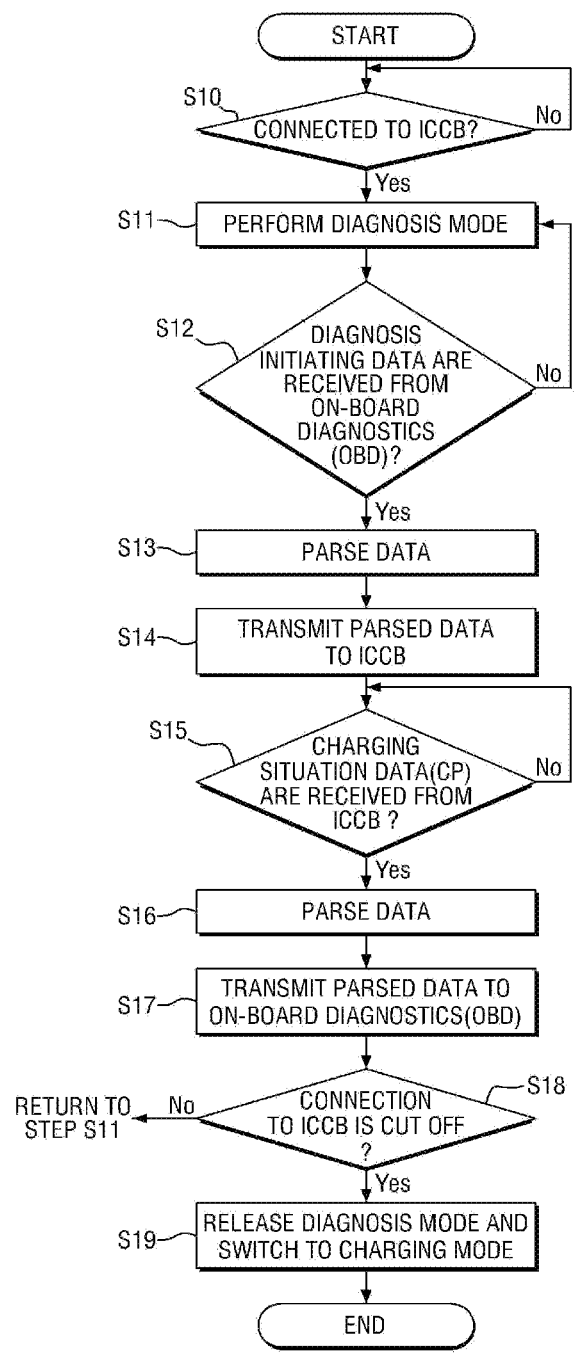
FIG. 2 is a flowchart illustrating a method of controlling the system for diagnosing the in-cable control box according to the present disclosure.

FIG. 2 is a flowchart illustrating a method controlling the ICCB diagnosis system 1 according to the present disclosure configured as described above.

Referring to FIG. 2, the control unit 30 of the ICCB diagnosis system 1 according to the present disclosure determines whether the ICCB 110 is connected to the diagnosis system 1 by checking whether the charging outlet 10 of the diagnosis system 1 is electrically connected to the connector 120 of the low-speed charging cable 100 (S10).

When it is determined that the ICCB 110 is connected to the diagnosis system 1, the control unit 30 enters the diagnosis mode and prepares to receive the diagnosis initiating data from the OBD device 200 of the vehicle (S11).

When the control unit 30 receives the diagnosis initiating data from the OBD device 200 of the vehicle through the CAN communication unit 40 (S12), the control unit 30 parses the diagnosis initiating data (S13) and transmits the parsed diagnosis initiating data to the ICCB 110 of the low-speed charging cable 100 (S14).

The term 'parsing' of the data refers to a computer programming term that indicates converting an instruction signal so that the instruction signal may be used by other programs or subroutines.

Next, the ICCB 110, which receives the diagnosis initiating data, produces the charging situation data and parses the charging situation data (the control pilot (CP)) (S16) when the control unit 30 receives the charging situation data from the ICCB 110 (S15).

In this case, the charging situation data (the control pilot (CP)), which are produced from the ICCB 110, are converted by the CP data conversion unit 20 into the data that may be read out by the control unit 30.

Thereafter, the control unit 30 transmits the parsed charging situation data to the OBD device 200 of the vehicle through the CAN communication unit 40 (S17).

Then, the OBD device 200, which receives the charging situation data, displays, on the display means (not illustrated) of the OBD device 200, the connection status with the vehicle during the charging operation, the maximum charging current value, the charging progress status, and whether the ICCB operates normally. As a result, it is possible to solve the problem in that the reason why charging is interrupted cannot be recognized, when the charging is interrupted due to an abnormal situation during a charging operation, by using the low-speed charging cable in the related art.

Thereafter, when the connection between the connector 120 of the low-speed charging cable 100 and the charging outlet 10 of the diagnosis system 1 is cut off (S18), the control unit 30 releases the diagnosis mode of the ICCB (S19) and switches to the charging mode from the diagnosis mode.

Figure 3:
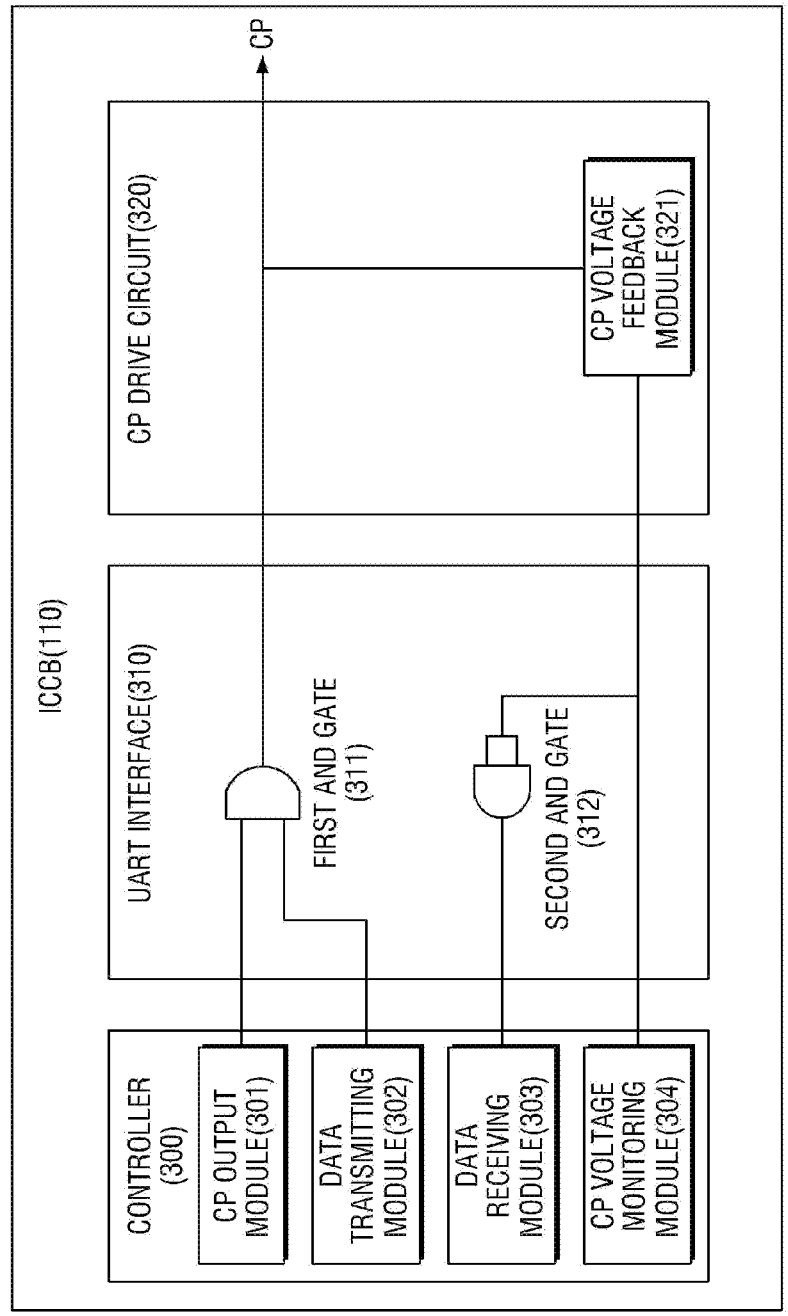
FIG. 3 is a detailed view of the in-cable control box according to the present disclosure.

FIG. 3 is a detailed view of the ICCB 110 of the low-speed charging cable 100 according to the present disclosure.

The ICCB 110 according to the present disclosure includes a controller 300, a UART (universal asynchronous receiver/transmitter) interface 310, and a CP drive circuit 320.

The controller 300 includes a CP output module 301, a data transmitting module 302, a data receiving module 303, and a CP voltage monitoring module 304.

The CP output module 301 is a part that produces a pulse width modulation (PWM) control signal having a predetermined duty ratio of the control pilot CP (the charging situation data).

That is, the CP output module 301 outputs the charging situation data (CP), which are produced by the data transmitting module 302, in the PWM manner by fixing the data transmitting module 302 to a high state in the charging mode. The CP output module 301 transmits the charging situation data (CP), which are outputted from the data transmitting module 302, to the CP drive circuit 320 by producing a control signal having a duty ratio of 100% in the diagnosis mode.

The data transmitting module 302 is a part that produces the charging situation data.

The UART interface 310 performs UART communication with the controller 300 and the CP drive circuit 320.

To this end, the UART interface 310 includes logic gates including a first AND gate 311 and a second AND gate 312.

As described above, the first AND gate receives the PWM control signal transmitted from the CP output module 301 of the controller 300 or the signal transmitted from the data transmitting module 302, and outputs any one of the signals to the CP drive circuit 320.

The second AND gate 312 is a logic gate that receives the output signal of a CP voltage of a CP voltage feedback module 321 of the CP drive circuit 320 and transmits the output signal to the data receiving module 303 of the controller 300.

The data receiving module 303 is a part that recognizes the data of the ICCB in the diagnosis mode by receiving a signal transmitted from the CP voltage feedback module 321 through the second AND gate 312 and recognizing the high/low level of the corresponding signal.

The CP voltage monitoring module 304 is a part that recognizes the CP voltage in the charging mode by receiving the CP voltage outputted from the CP voltage feedback module 321 of the CP drive circuit 320 and reading an ADC (analog to digital) voltage level of the CP voltage.

The CP drive circuit 320 produces the charging situation signal CP and outputs the CP with a predetermined duty ratio in accordance with the PWM control signal from the CP output module 301 of the controller 300.

The CP voltage feedback module 321 is a part that feeds the CP signal, which is outputted from the CP drive circuit 320, back to the second AND gate 312 and the CP voltage monitoring module 304, and changes the voltage level so that the second AND gate 312 and the CP voltage monitoring module 304 may be recognized.

Figure 4:
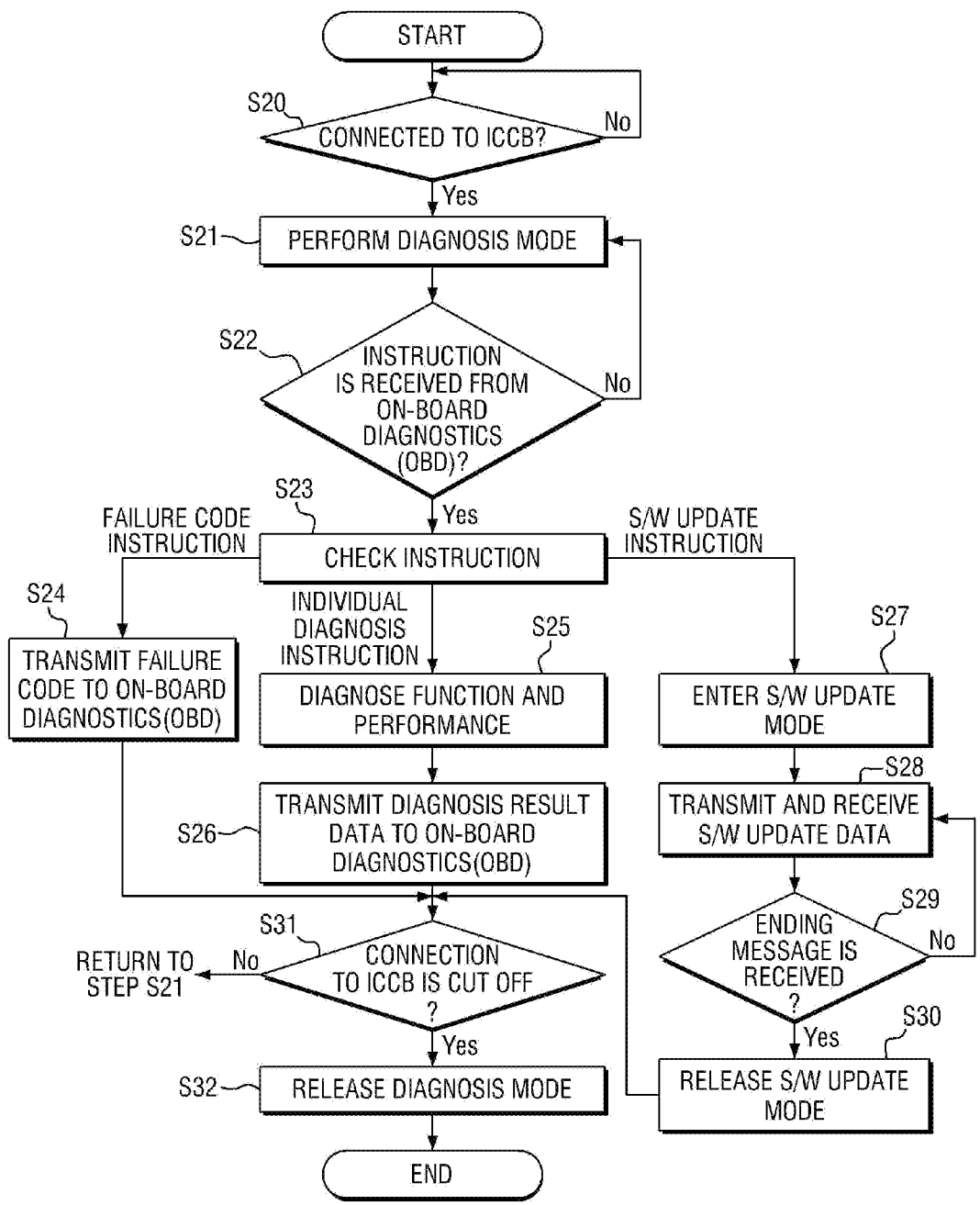
FIG. 4 is a flowchart illustrating a method of controlling the in-cable control box according to the present disclosure.

FIG. 4 is a flowchart illustrating a process of controlling the ICCB according to the present disclosure.

First, the ICCB 110 checks whether the ICCB diagnosis system 1 of the vehicle is connected to the ICCB 110 (S20).

The connection between the ICCB diagnosis system 1 and the ICCB 110 is checked by checking whether the connector 120 of the low-speed charging cable 100 is connected to the charging outlet 10 of the diagnosis system 1.

Next, when the connector 120 of the low-speed charging cable 100 is connected to the charging outlet 10 of the diagnosis system 1, the ICCB 110 enters the diagnosis mode for diagnosing the ICCB 110 by receiving a diagnosis initiating instruction from the OBD device 200 (S21).

Next, the ICCB 110 checks whether the diagnosis initiating instruction is received from the OBD device 200 of the vehicle (S22), and checks the type of instruction when the diagnosis initiating instruction is received from the OBD device 200 (S23), thereby executing the corresponding instruction for each of the following steps.

First, in a case in which the instruction received in step S23 is an instruction to request a response to a failure code that indicates whether the current ICCB 110 is currently in a failure state, the ICCB 110 recognizes whether the ICCB 110 is currently in the failure state, and the ICCB 110 transmits the failure code corresponding to the recognized failure state to the OBD device 200 of the vehicle (S24). In this case, the corresponding failure code may be transmitted as much as the required data from the OBD device 200.

Next, in a case in which the instruction received in step S23 is an instruction to request individual diagnosis to diagnose whether the function of each of the parts installed in the ICCB 110 operates normally, the ICCB 110 diagnoses whether the function of each of the parts installed in the ICCB 110 normally operates (S25), and the ICCB 110 transmits diagnosis result data, which are obtained by the diagnosis, to the OBD device 200 (S26).

In a case in which the instruction received in step S23 is an update performing instruction to request update of a drive program for operating the ICCB 110, the ICCB 110 enters an update mode for updating the drive program (S27), and the ICCB 110 receives the data required to update the drive program from the OBD device 200 (S28).

The ICCB 110 checks whether an update ending message, which indicates that the update of the drive program is ended, is received from the OBD device 200 (S29), and the ICCB 110 ends the update mode of the drive program (S30) when the ending message is received.

After the respective steps S24, S26, and S30 are performed, the ICCB 110 checks whether the connection between the connector 120 of the low-speed charging cable 100 and the charging outlet 10 of the diagnosis system 1 is cut off (S31), and the ICCB 110 releases the diagnosis mode (S32) and controls the operation of the charging mode, which is the basic operation of the ICCB, when the connection between the connector 120 of the low-speed charging cable 100 and the charging outlet 10 of the diagnosis system 1 is cut off.

The control of the operation of the charging mode of the ICCB indicates that the commercially available alternating current power is controlled to be applied to the vehicle by switching the embedded relay to the On state when it is recognized that the charging preparation is completed in the state in which the connector 120 of the low-speed charging cable 100 is connected to the charging outlet 10 of the electric vehicle. Specifically, the control may include the control for protecting the user and the vehicle from overvoltage or overcurrent during the charging operation during the operation of charging the battery of the vehicle, and for displaying the connection status with the vehicle during the charging operation, the maximum charging current value, and the charging progress status on the display means (not illustrated) attached to the casing of the ICCB 110.

According to the system for diagnosing an in-cable control box for an electric vehicle and the method for controlling the system according to the present disclosure configured as described above, the ICCB may transmit and receive the data, such that the ICCB may clearly display, on the display means, the reason why the charging is interrupted, thereby quickly recognizing a failure site of the ICCB and preventing abnormal maintenance. In addition, a separate procedure of certification for wireless communication is not required, and a size of the low-speed charging cable may be kept compact. Furthermore, it is possible to update software, diagnose an internal failure, and check a charging history without damaging the casing any further.

The above description is merely illustrative of the technical idea of the present disclosure, and those of ordinary skill in the art to which the present disclosure pertains will be able to make various modifications and variations without departing from the essential characteristics of the present disclosure.

Accordingly, the embodiments disclosed in the present disclosure are not intended to limit the technical idea of the present disclosure, but to explain the technical idea, and the scope of the technical idea of the present disclosure is not limited by these embodiments. The scope of protection of the present disclosure should be interpreted by the following claims, and all technical ideas within the scope equivalent thereto should be construed as being included in the scope of the present disclosure.

What is claimed is:

1. A system for diagnosing an in-cable control box (ICCB), wherein the system is disposed in a vehicle, and has one side electrically connected to a low-speed charging cable having an ICCB and another side electrically connected to an on-board diagnostics (OBD) device, the system comprising:
    a Control Pilot (CP) data conversion unit configured to receive charging situation data produced from the ICCB;
    a Controller Area Network (CAN) communication unit configured to receive diagnosis initiating data for the ICCB produced from the OBD device; and
    a control unit configured to:
        receive the charging situation data from the CP data conversion unit,
        convert the charging situation data into data recognizable by the OBD device,
        receive the diagnosis initiating data from the CAN communication unit,
        and convert the diagnosis initiating data into data recognizable by the ICCB,
    wherein, when the connection with the ICCB is recognized, the control unit receives the diagnosis initiating data from the OBD device and transmits the diagnosis initiating data to the ICCB and the control unit receives the charging situation data from the ICCB and transmits the charging situation data to the OBD device, so that the OBD device diagnoses the ICCB.

2. The system of claim 1, wherein the control unit releases a diagnosis mode of the ICCB and switches to a charging mode when the connection with the ICCB is cut off.

3. The system of claim 1, further comprising a CP level adjustment unit configured to adjust a voltage level of the CP to update the ICCB when an instruction to request update of a drive program is received from the OBD device.

4. An in-cable control box (ICCB) of a low-speed charging cable for an electric vehicle, the ICCB comprising:
   a controller configured to produce charging situation data;
   a Control Pilot (CP) drive circuit configured to output the charging situation data produced from the controller; and
   a Universal Asynchronous Receiver/Transmitter (UART) interface connected between the CP drive circuit and the controller, the UART interface configured to perform UART communication.

5. The ICCB of claim 4, wherein the controller comprises:
   a CP output module configured to produce a control signal so that the charging situation data have a predetermined duty ratio;
   a data transmitting module configured to produce the charging situation data;
   a data receiving module configured to receive diagnosis initiating data from the CP drive circuit; and
   a CP voltage monitoring module configured to recognize a CP voltage by reading a voltage level of the CP voltage outputted through the CP drive circuit.

6. The ICCB of claim 5, wherein the UART interface comprises logic gates comprising a first AND gate and a second AND gate,
   wherein the first AND gate receives at least one of a Pulse-Width Modulation (PWM) control signal transmitted from the CP output module of the controller or a signal transmitted from the data transmitting module, and outputs any one of the signals to the CP drive circuit, and
   wherein the second AND gate receives an output signal of a CP voltage of a CP voltage feedback module of the CP drive circuit and transmits the output signal to the data receiving module and the CP voltage monitoring module.

7. The ICCB of claim 5, wherein the CP output module, in a charging mode, outputs the charging situation data produced by the CP output module in a PWM manner by controlling the data transmitting module to be in a high state, and transmits the charging situation data to the CP drive circuit, and
   wherein the CP output module, in a diagnosis mode, produces a control signal having a duty ratio of 100%, and transmits data outputted from the data transmitting module to the CP drive circuit.

* * * * *